United States Patent Office 2,868,796
Patented Jan. 13, 1959

2,868,796

AMINO-VINYLPYRIDINES AND PROCESS OF MAKING THEM

Francis E. Cislak, Indianapolis, Ind., assignor to Reilly Tar & Chemical Corporation, Indianapolis, Ind., a corporation of Indiana No Drawing. Application June 20, 1957
Serial No. 667,053

8 Claims. (Cl. 260—296)

This invention relates to new chemical compounds and to the process of making them. More particularly, it relates to 2-amino-vinylpyridines and to 4-amino-vinyl-pyridines having the structural formulae:

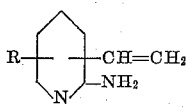

and

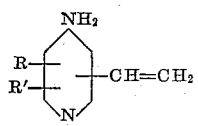

where R is hydrogen, lower alkyl, benzyl, or benzhydryl, and R' is hydrogen or lower alkyl.

In general the compounds of my invention may be prepared by the dehydration of an amino-ethanolpyridine. The equation below depicts the preparation of 2-amino-6-vinyl-pyridine from 2-amino-6-ethanolpyridine.

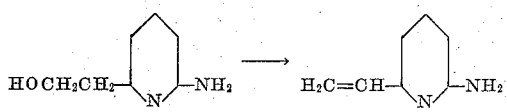

The dehydration may be accomplished by vaporizing the 2-amino-ethanolpyridine through a non-acid dehydrating catalyst maintained at a dehydrating temperature. I can use a large number of dehydrating catalysts, such as, alkali metal hydroxides, alumina, alumina-silica, and the like. These catalysts may be used in any suitable form, for example, the alkali metal hydroxides may be fused or in aqueous solution or they may be adsorbed on a porous support; the alumina and the alumina-silica may be used in pellet form or as a very fine powder. As suitable dehydrating temperatures, I have found temperatures above the boiling point of water, preferably above about 150° C. and more desirably above about 175° C. To avoid excessive polymerization of the 2-amino-vinylpyridine, it is desirable to remove it from the reaction zone and cool is as rapidly as possible.

The 2-amino-ethanolpyridines used in my present invention are new compounds. The process of preparing them is described in my copending applications Serial No. 599,322 and Serial No. 599,323, both filed July 23, 1956.

The 4-amino-ethanolpyridines used in my present invention also are new compounds. The process of preparing them is described in my copending application Serial No. 667,052 filed even date herewith.

My invention will be described more fully in conjunction with the following specific examples. It should be understood, however, that these examples are given by way of illustration only, and that my invention is not to be limited by the details set forth therein.

EXAMPLE 1

*2-amino-6-vinylpyridine*

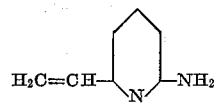

2-amino-6-(1-ethan-2-ol)pyridine, preferably dissolved in one to three parts of water, is desirably preheated to a temperature of about 100° C. and passed into liquid aqueous caustic soda, of about 50% to 80% strength, maintained at a temperature of about 150° C. to about 250° C., but desirably at about 175° C., and being maintained under partial vacuum. The hot caustic soda vaporizes the solution of the 2-amino-6-ethanolpyridine and converts the latter into 2-amino-6-vinylpyridine. The vapors of the vinylpyridine, water, and any unchanged 2-amino-6-ethanolpyridine are condensed and collected in any suitable receiver.

The 2-amino-6-vinylpyridine is separated from the water and any unreacted 2-amino-6-ethanolpyridine in any convenient manner. One way of separating the 2-amino-6-vinylpyridine is by means of vacuum flash distillation. The 2-amino-6-vinylpyridine distills over with the water, and the 2-amino-6-ethanolpyridine remains behind as a residue. The 2-amino-6-vinylpyridine is then separated from the water by means of flake caustic soda.

EXAMPLE 2

*2-amino-3-vinylpyridine*

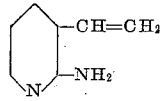

I vaporize 2-amino-3-(1-ethan-1-ol)pyridine, mix it with water vapor, nitrogen or carbon dioxide if desired, and pass it through a suitable reactor containing an alumina dehydrating catalyst. The reactor is maintained under partial vacuum at a temperature of from about 200° C. to about 400° C. As the 2-amino-3-ethanolpyridine passes through the reactor, it is decomposed into water and 2-amino-3-vinylpyridine. The vapors of the 2-amino-3-vinylpyridine, water, any diluent gas if present, and any unchanged 2-amino-3-ethanolpyridine are promptly removed from the reactors and are promptly condensed, cooled, collected in a suitable reactor and inhibited to retard polymerization.

EXAMPLE 3

*2-amino-4-vinylpyridine*

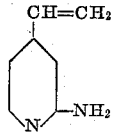

The procedure of Example 2 is repeated except that I use 2-amino-4-(1-ethan-2-ol)pyridine in place of the 2-amino-3-(1-ethan-1-ol)pyridine and I recover 2-amino-4-vinylpyridine.

EXAMPLE 4

*2-amino-3-ethyl-6-vinylpyridine*

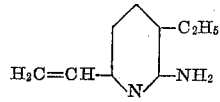

The procedure of Example 2 is repeated except that I use 2-amino-3-ethyl-6-(-1-ethan-2-ol)pyridine in place of the 2-amino-3-(1-ethan-1-ol)pyridine and recover 2-amino-3-ethyl-6-vinylpyridine.

EXAMPLE 5

*2-amino-3-vinyl-6-methylpyridine*

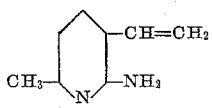

The procedure of Example 2 is repeated except that I use 2-amino-3-(1-ethan-1-ol)-6-methylpyridine instead of the 2-amino-3-(1-ethan-1-ol)pyridine, and I recover 2-amino-3-vinyl-6-methylpyridine.

EXAMPLE 6

*2-vinyl-4-aminopyridine*

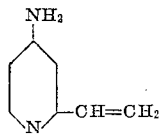

I vaporize 2-ethanol-4-aminopyridine, mix it with water vapor, nitrogen, or carbon dioxide if I desire, and pass it through a suitable reactor containing an alumina dehydrating catalyst. The reactor is maintained under a partial vacuum and at a temperature of from about 200° C. to about 400° C. As the 2-ethanol-4-aminopyridine passes through the reactor, it is decomposed into water and 2-vinyl-4-aminopyridine. The vapors of the 2-vinyl-4-aminopyridine water, any diluent gas if present, and any unchanged 2-ethanol-4-aminopyridine are promptly removed from the reactor, condensed, cooled, collected in a suitable receiver and inhibited to retard polymerization of the 2-vinyl-4-aminopyridine.

EXAMPLE 7

*4-amino-3-vinylpyridine*

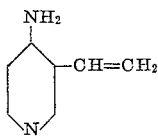

The procedure of Example 6 is repeated except that I use 4-amino-3-(1-ethan-1-ol)pyridine in place of the 2-ethanol-4-aminopyridine and I recover 4-amino-3-vinylpyridine.

The 2-amino-vinylpyridines are useful in the preparation of polymers and co-polymers. When copolymerized with acrylonitrile, they yield a product particularly useful for the manufacture of synthetic fibers; the presence of the pyridine ring nitrogen and also of the amino group imparts good dyeing qualities to the acrylonitrile-2-amino-vinylpyridine fibers.

Thermal polymerization of the 2-amino-vinylpyridines proceeds, in the presence of a strong base, to give pyridylethylamines. Thus, 2-amino-6-vinylpyridine gives a polymeric pyridylethylamine having the formula:

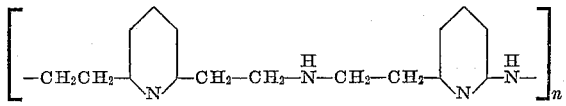

This application is a continuation-in-part of Serial No. 639,193, filed February 11, 1957, now abandoned.

I claim as my invention:

1. A compound of the class consisting of 2-amino-vinylpyridines and 4-amino-vinylpyridines having the general formulae:

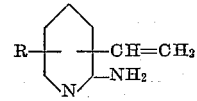

and

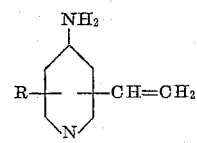

where R is selected from the group consisting of hydrogen and lower alkyl.

2. 2-amino-6-vinylpyridine.
3. 4-amino-2-vinylpyridine.
4. 2-amino-4-vinylpyridine.
5. 4-amino-3-ethyl-2-vinylpyridine.
6. 4-amino-3-vinylpyridine.
7. The process of preparing the compounds of claim 1 which comprises dehydrating a compound of the class consisting of 2-amino-ethanolpyridine and 4-amino-ethanol-pyridine having the general formulae:

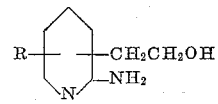

and

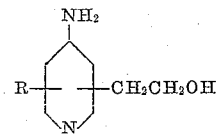

where R is selected from the group consisting of hydrogen and lower alkyl.

8. The process of preparing the compounds of claim 1 which comprises vaporizing a compound of the class consisting of 2-amino-ethanolpyridine and 4-amino-ethanol-pyridine having the general formulae:

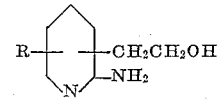

and

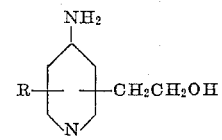

where R is selected from the group consisting of hydrogen and lower alkyl, passing it through a reactor containing a non-acid dehydrating catalyst maintained at a temperature of from about 200° C. to about 400° C., removing the vapors from the reactor, condensing the vapors, and recovering the amino-vinylpyridine.

References Cited in the file of this patent

UNITED STATES PATENTS

| | | |
|---|---|---|
| 2,745,834 | Mertz | May 15, 1956 |
| 2,749,349 | Cislak | June 5, 1956 |